United States Patent
Verma et al.

[11] Patent Number: 5,942,695
[45] Date of Patent: Aug. 24, 1999

[54] METHOD AND APPARATUS FOR MEASURING SEAT LOADING BY STRAIN GAUGE

[75] Inventors: Shailendra Verma, Indianapolis; Craig Tieman, Carmel; Mahesh K. Chengalva, Kokomo; Duane Donald Fortune, Lebanon, all of Ind.

[73] Assignee: Delco Electronics Corp, Kokomo, Ind.

[21] Appl. No.: 08/995,803

[22] Filed: Dec. 22, 1997

[51] Int. Cl.⁶ ..................................................... G01B 7/16
[52] U.S. Cl. .............................................................. 73/768
[58] Field of Search ........................ 73/862.541, 862.627, 73/786, 775, 794, 795, 172, 768

[56] References Cited

U.S. PATENT DOCUMENTS

| | | |
|---|---|---|
| 2,154,561 | 4/1939 | Breer et al. . |
| 3,147,617 | 9/1964 | Kaptur, Jr. et al. ...................... 73/172 |
| 3,413,849 | 12/1968 | Janapol . |
| 3,592,041 | 7/1971 | Spencer . |
| 5,112,018 | 5/1992 | Wahls . |
| 5,373,749 | 12/1994 | Strand et al. . |
| 5,456,019 | 10/1995 | Dowell et al. . |
| 5,536,059 | 7/1996 | Amirouche . |
| 5,641,917 | 6/1997 | Hurite et al. ........................... 73/865.3 |
| 5,753,834 | 5/1998 | Stewart ................................. 73/865.3 |

FOREIGN PATENT DOCUMENTS

| | | |
|---|---|---|
| 140 | 3/1905 | United Kingdom . |
| 986093 | 3/1965 | United Kingdom . |

*Primary Examiner*—Richard Chilcot
*Assistant Examiner*—Jewel V. Thompson
*Attorney, Agent, or Firm*—Jimmy L. Funke

[57] ABSTRACT

An existing vehicle seat design is equipped with strain gauges welded to structural seat members to sense occupant seated weight. A microprocessor compensates for preload on the sensors and multiplies each signal by an empirically determined gain, and then combines the gauge outputs. The combined output is low pass filtered to avoid motion induced errors. The measured occupant seated weight is used by decision logic to decide whether to allow passenger airbag deployment.

11 Claims, 3 Drawing Sheets

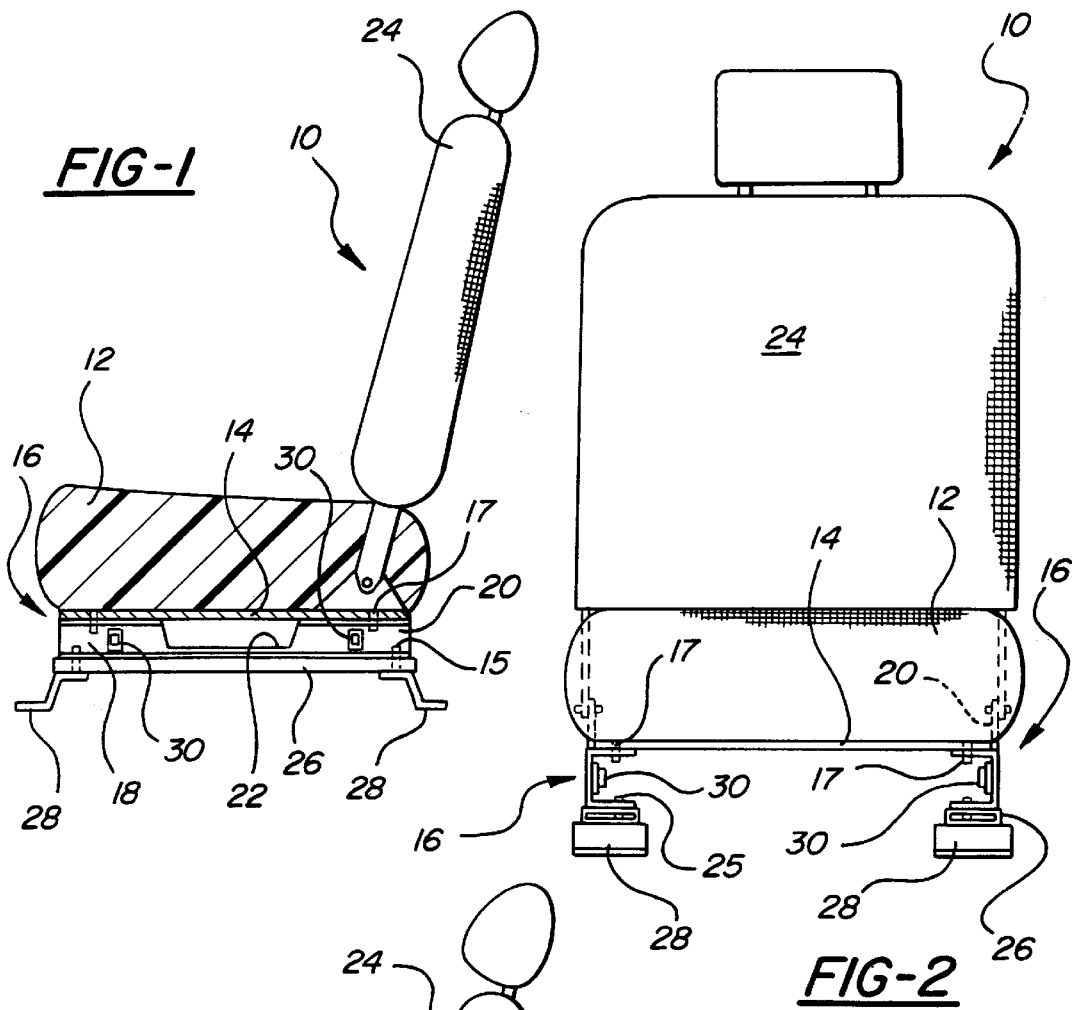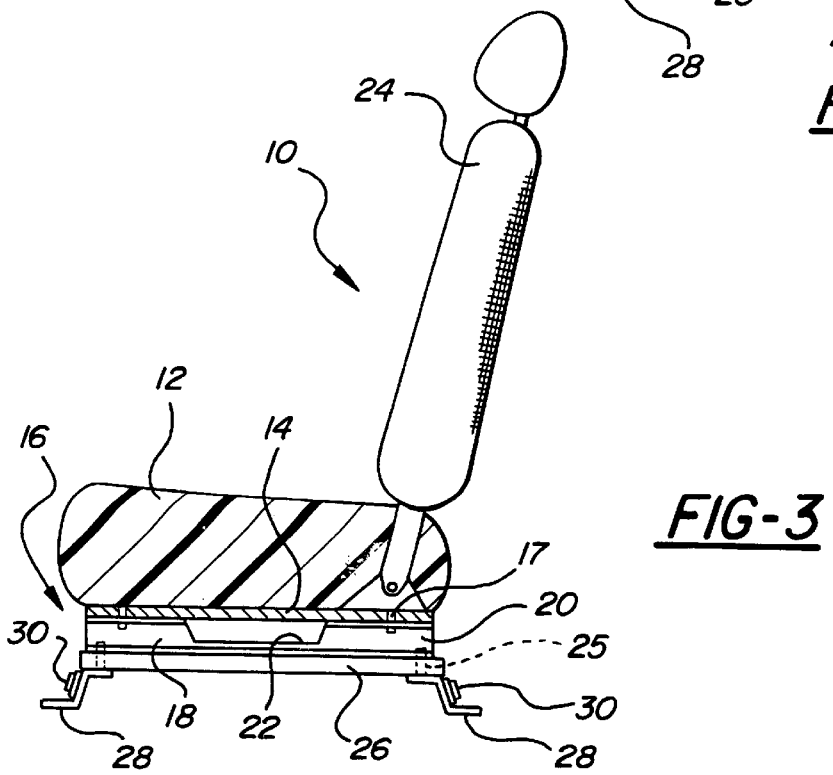

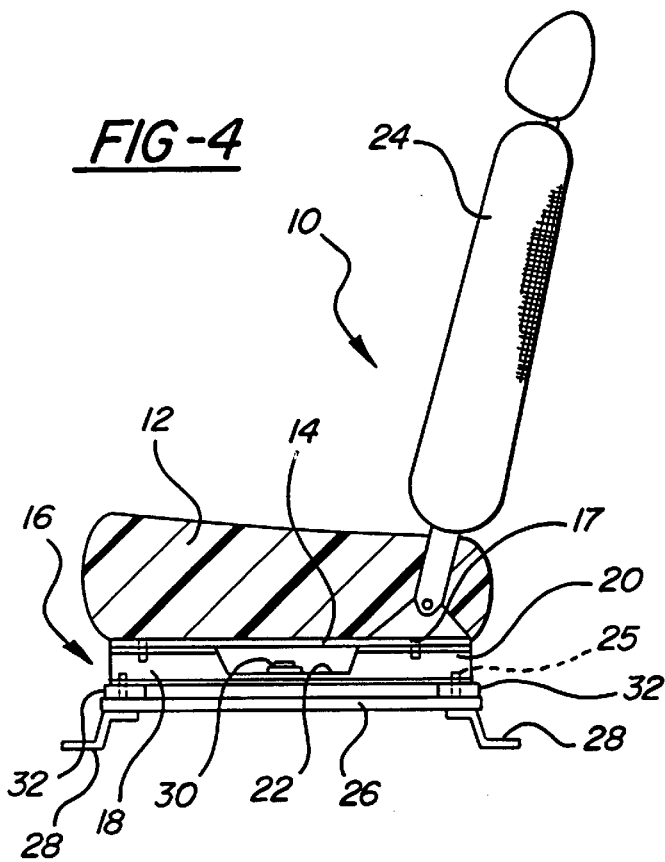
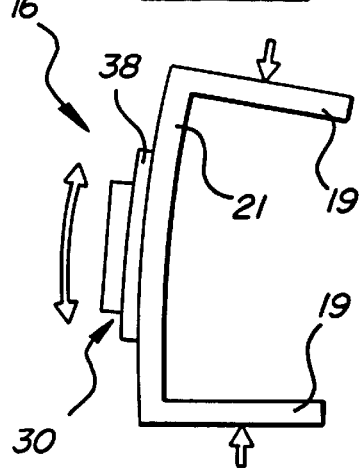
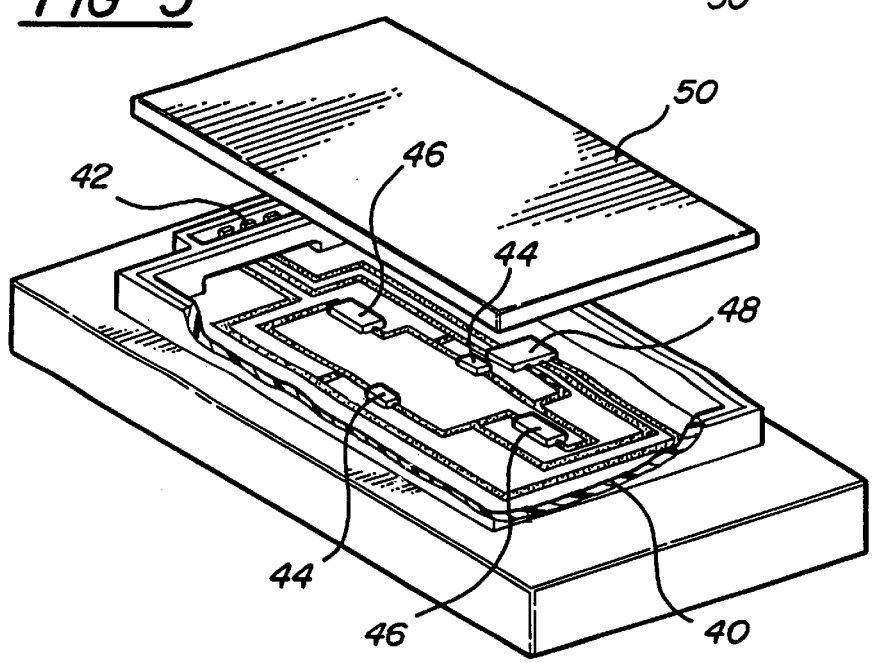

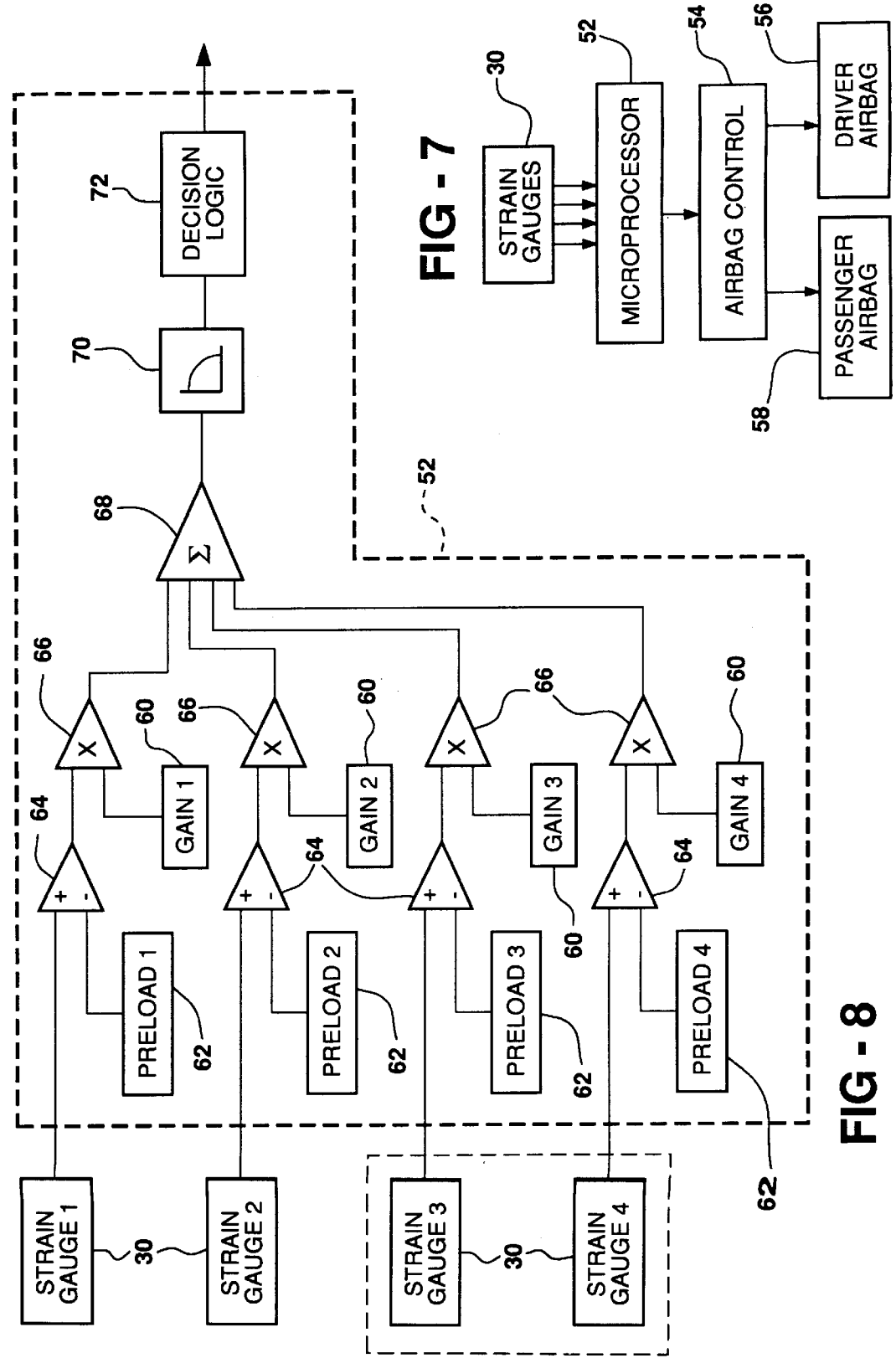

METHOD AND APPARATUS FOR MEASURING SEAT LOADING BY STRAIN GAUGE

FIELD OF THE INVENTION

This invention relates to determining vehicle seat loading and particularly to a method and apparatus for determining the seated weight of a seat occupant using strain gauges on the seat structure.

BACKGROUND OF THE INVENTION

Airbag systems in vehicles often are fashioned to deploy all airbags when a crash occurs. If the passenger seat is empty or contains a child or other small occupant it is desirable to inhibit deployment since the airbag deployment may be useless or even counterproductive. It is thus necessary to detect whether a large occupant is present.

One approach to detecting occupant size is to employ a sensor in the seat cushion and measure weight on the cushion surface. This does not measure weight on the seat back which makes the solution less accurate.

Another approach is to attach load cells between the seat frame and the seat track at the mounting locations. This measures the seat back weight but requires redesign of the seat; otherwise the addition of load cells would change the effective height of the seat. Also attachment between the seat frame and the seat track makes the load cell a structural component which requires reevaluation of the seat design to assure that crash worthiness requirements are met.

SUMMARY OF THE INVENTION

It is therefore an object of the invention to accurately determine weight of an occupant in a vehicle seat without significantly changing the seat structure. That is, to determine occupant seated weight using existing seat designs, or seats which are not designed especially for that purpose.

The seat structural parts, which include a frame and support feet carry all of the seated occupant weight as well as the weight of the bottom seat cushion and seat back. The weight can be accurately determined by strategically placing strain gauges on that structure and suitably processing the gauge outputs. As one example, the frame has side brackets with front and rear portions which attach to the cushion and/or the seat back; strain gauges on those front and rear portions are responsive to all the cushion and occupant seated weight. The gauge outputs are adjusted to compensate for preload as well as for the gauge response for each mounting site. Another example is the placement of strain gauges on the bracket intermediate portion which connects the front and rear portions. This uses fewer gauges. Still another approach is to place the strain gauges on the support feet.

BRIEF DESCRIPTION OF THE DRAWINGS

The above and other advantages of the invention will become more apparent from the following description taken in conjunction with the accompanying drawings wherein like references refer to like parts and wherein:

FIG. 1 is a side view of a seat equipped with strain gauges according to the invention;

FIG. 2 is a front view of the seat of FIG. 1;

FIG. 3 is a side view of a seat equipped with strain gauges according to another embodiment of the invention;

FIG. 4 is a side view of a seat equipped with strain gauges according to yet another embodiment of the invention;

FIG. 5 is an isometric view, partly exploded, of a strain gauge for use in carrying out the invention;

FIG. 6 is a diagrammatic view of a strain gauge attached to a seat member, in cross section, which has a bending mode;

FIG. 7 is a circuit diagram illustrating the application of the invention; and

FIG. 8 is a processing flow diagram for the function of a processor of FIG. 6 according to the invention.

DESCRIPTION OF THE INVENTION

Referring to FIGS. 1 and 2, a vehicle seat 10 has a seat cushion 12 which includes a support 14 such as a seat pan or suspension at its bottom. The support 14 is attached to brackets 16, one on each side, by bolts 17. Each bracket has a front riser portion 18 and a rear riser portion 20 which engage the support 14, and an intermediate beam 22 interconnecting the riser portions. A seat back 24 is pivotally supported on the rear riser portions 20. The brackets 16, in turn are mounted by bolts 25 on tracks 26 which allows fore and aft adjustment of the seat. Support feet 28 are connected to the four corners of the tracks 26 and are bolted to the vehicle floor, not shown.

Although seat designs vary, the seat described herein is one common structure currently in use in vehicles and is somewhat typical of most seat designs. In any event, the occupant seated weight is sensed without incurring any structural alteration of the seat design. Strain gauges 30 are rigidly attached (as by welding) to the front and rear riser portions of the brackets 16 such that they respond to the full occupant seated weight whether transmitted only through the cushion 12 or partially through the seat back 24. In this manner the entire weight is measured and an accurate assessment of the occupant size can be determined by suitably combining the strain gauge outputs.

A second embodiment is shown in FIG. 3 wherein the same seat structure is used and the same reference numerals 30 apply. In this case the strain gauges 30 are applied to the four feet 28, thereby sensing all the seated weight of the occupant. This configuration, like that of FIG. 1 requires four strain gauges for full implementation.

A third embodiment requires only two strain gauges. The seat structure, as shown in FIG. 4, is slightly altered by incorporating a thin spacer 32 at each bolt to slightly separate the brackets 16 from the tracks 26. The spacers support the brackets at their extreme ends so that the vertical force imposed by the cushion support 14 on the riser portions 18 and 20 inboard of the spacers applies a moment to the beams 22 which connect the riser portions. Since the beams are thus allowed to flex slightly due to their separation from the track, strain gauges 30 on the two beams 22 will respond to the total force applied to the brackets.

In each embodiment the structural member on which a strain gauge is mounted is rigid but there is enough sensitivity in the linear region such that the strain can be sensed by a commercial strain gauge. The strain gauges need to have a rigid attachment such as a weld to ensure that the sensor bends with the bracket or foot. This requires an accurate, reliable, weldable strain gauge. Such a gauge 30 is shown in FIG. 5. A steel substrate 38 supports a housing 40 having a circuit connector 42 at one end. The housing contains a hybrid circuit including a Wheatstone bridge having two resistors 44 in one pair of opposite arms and two thick film piezoresistors 46 in another pair of opposite arms. The piezoresistors afford a gauge factor of about 20. Ground and power lines are supplied to the bridge by the connector 42. Bridge output lines are coupled to a signal conditioning and amplification integrated circuit 48 which has its output connected to the connector. A cover 50 fits on the housing to protect the circuit. The steel substrate extends beyond the housing sufficiently to permit welding to a structural member of the seat. The gauge responds to a bending moment and is mounted to a seat member subject to bending due to the weight, as shown in the exaggerated example of FIG. 6. There a channel-shaped bracket 16 has a pair of horizontal flanges 19 connected by a vertical web portion 21 subject to bending under the occupant weight which is applied to the flanges. The gauge substrate 38 is welded to the web so that the bending moment is transmitted to the substrate and the piezoresistors. Thus in operation the piezoresistors 46 sense strain imparted to the substrate 38 via the welds to generate a bridge signal. The proximity of the signal conditioning electronics to the origin of the signal and the high gauge factor of the piezoresistors reduce the noise to afford a clean robust output.

The strain gauges 30 are inputs to a circuit, as shown in FIG. 7, comprising a microprocessor 52 which processes the strain signals to determine whether the deployment of the passenger airbag should be inhibited, and the microprocessor output is connected to an airbag control module 54 which decides whether to deploy the driver airbag 56 and/or the passenger airbag 58.

FIG. 8 illustrates the processing flow in the microprocessor 52. Four strain gauges 30 are shown as required in the embodiments of FIGS. 1, 2, and 3, but only two are used for the embodiment of FIG. 4. During vehicle manufacture or at the time of seat manufacture, each seat is tested to sense the response of each gauge by applying a known force on each seat corner and then a gain 60 is calculated for each gauge to normalize the response. Each gain 60 is stored in the microprocessor memory for that seat. Preloads are applied to each strain gauge due to the weight of the seat cushions and other components as well as the stress due to bolting the seat to the vehicle. After manufacture each seat is evaluated to determine the gauge output due to such preloading and a preload value 62 for each gauge is stored in the memory. The microprocessor 52 is programmed to subtract each preload value 62 from the corresponding strain gauge 30 output as indicated by the difference function 64 and the resulting differences are multiplied by the corresponding gains 60 at the multiplier functions 66. The results represent strain due to occupant weight and are added at summer function 68 to obtain the total instantaneous occupant weight on the seat. This weight is low-pass filtered at a filter function 70 to remove the effects of motion induced weight errors to obtain the average occupant seated weight. Then decision logic 72 processes the average occupant seated weight to make the decision to suppress or allow passenger airbag deployment.

It will thus be seen that accurate occupant seated weight measurements can be made by adding strain gauges to structural members in existing seat designs in a manner which does not in any way deter from the integrity of the seat nor add to the cost of the seat itself. Moreover, the added sensor apparatus and the processing of the information is accomplished inexpensively.

The embodiments of the invention in which an exclusive property or privilege is claimed are defined as follows:

1. In a vehicle seat having structural members including brackets supporting a seat cushion and a seat back and mounting feet supporting the brackets, apparatus for measuring occupant seated weight comprising:

a plurality of strain gauges, each having a rigid substrate, bonded to at least some of the structural members in strategic locations to sense weight distributed in both front and rear seat regions; and a processor coupled to the strain gauges for determining occupant seated weight.

2. Apparatus as defined in claim 1 wherein:

the brackets are disposed on either side of the seat and comprise front and rear portions; and the strain gauges are located on the front and rear portions of each bracket.

3. Apparatus as defined in claim 1 wherein:

the brackets are disposed on either side of the seat and each comprise a front and rear portion connected by an intermediate beam;

means supporting each front and rear portion such that occupant seated weight in both front and rear seat positions imposes strain on the respective intermediate beam; and one of the strain gauges is located on the intermediate beam of each bracket.

4. Apparatus as defined in claim 1 wherein:

the brackets are disposed on either side of the seat and comprise front and rear risers connected by an intermediate beam, the risers being coupled to the seat cushions;

spacers located at both ends of each bracket for supporting the front and rear risers such that occupant seated weight in both front and rear seat positions imposes strain on the intermediate beam; and one of the strain gauges is located on the intermediate beam of each bracket.

5. Apparatus as defined in claim 1 wherein:

each one of the strain gauges is located on a respective one of the feet.

6. Apparatus as defined in claim 1 wherein:

each strain gauge has a steel substrate; and the substrate is welded to a structural member.

7. In a vehicle seat having structural members including brackets supporting seat cushions and mounting feet supporting the brackets, a method of measuring the occupant seated weight comprising the steps of:

welding strain gauges to structural members to measure strain in the members due to occupant seated weight; and processing gauge outputs to determine total occupant seated weight.

8. The method as defined in claim 7 wherein the step of processing gauge outputs comprises:

compensating the output from each gauge for preload and gain to obtain compensated signals; and summing the compensated signals to obtain a measure of occupant seated weight.

9. The method as defined in claim 7 wherein the step of processing gauge outputs comprises:

compensating the output from each gauge for preload and gain to obtain compensated signals;

summing the compensated signals to obtain an instantaneous measure of occupant seated weight; and low pass filtering the instantaneous measure of occupant seated weight to obtain average occupant seated weight.

10. The method as defined in claim 8 wherein the step of compensating the output for preload includes measuring a preload value for each gauge during manufacture.

11. The method as defined in claim 8 wherein the step of compensating the output for gain includes determining a gain value for each gauge during manufacture.

* * * * *